United States Patent [19]

Wu

[11] 4,220,925
[45] Sep. 2, 1980

[54] ENCODING ANALOG SIGNALS INTO DIGITAL SIGNALS USING A TRIANGULAR REFERENCE

[75] Inventor: Chin Tao Wu, N. Brunswick, N.J.

[73] Assignee: RCA Corporation, New York, N.Y.

[21] Appl. No.: 814,557

[22] Filed: Jul. 11, 1977

[51] Int. Cl.² .......................... H04B 1/00; G11B 5/00
[52] U.S. Cl. .................................. 328/150; 307/356; 328/146; 360/32
[58] Field of Search ................ 340/347 NT, 347 AD, 340/347 CC, 347 DA, 347 SH; 324/78 D, 99 D; 360/32; 364/832

[56] References Cited

U.S. PATENT DOCUMENTS

| | | | |
|---|---|---|---|
| 3,192,519 | 6/1965 | Anderson | 340/347 AD |
| 3,277,395 | 10/1966 | Grindle et al. | 332/9 T |
| 3,500,109 | 3/1970 | Sugiyama et al. | 340/347 AD |
| 3,506,920 | 4/1970 | Swanson | 325/142 |
| 3,513,400 | 5/1970 | Russell | 332/9 T X |
| 3,540,035 | 11/1970 | Li | 340/347 DA |
| 3,587,092 | 6/1971 | Kelley et al. | 340/347 AD |
| 3,646,545 | 2/1972 | Naydan et al. | 340/347 DA |
| 3,667,046 | 5/1972 | Schoolcraft | 325/142 X |
| 3,746,990 | 7/1973 | Le Diberder et al. | 325/38 B |
| 3,914,760 | 10/1975 | Logue | 340/347 CC |
| 3,918,050 | 11/1975 | Dorsman | 340/347 M |

OTHER PUBLICATIONS

Harris Semiconductor, Encoding/Decoding Circuit Handles Audio Signals—Electronics Design 5, Mar. 1, 1977, pp. 83 & 84.

*Primary Examiner*—Thomas J. Sloyan
*Attorney, Agent, or Firm*—Samuel Cohen; Robert L. Troike; Donald W. Phillion

[57] ABSTRACT

Apparatus and method for converting an analog input signal to a digital signal by modulating the analog signal with a periodic triangular wave-shape signal to produce intermediate digital signals and Exclusive-ORing these intermediate signals with a square wave signal having the same phase as the triangular wave-shape signal.

9 Claims, 14 Drawing Figures

ENCODING ANALOG SIGNALS INTO DIGITAL SIGNALS USING A TRIANGULAR REFERENCE

This invention relates to transmission of information by converting analog information signals to digital signals for transmission and, upon receipt, converting the received digital signals to analog signals.

The transmission of analog signals in electrically noisy environment is generally not reliable without some modulation and demodulation. Similarly, if analog signals are recorded on magnetic tape in the unmodulated form, the slowly varying portions of the recorded signal are more severely distorted because of the inability of the magnetic flux domains in the tape to respond to slow changes. These problems are reduced by converting the analog signal into a digital signal which is less subject to transmission and recording distortion. The received, or playback, digital signal can then be demodulated into the analog form of the original signal.

There are several kinds of pulse code modulation techniques including pulse duration modulation in which the length or time duration of the pulse represents, or is proportional to, the analog value of the information signal. Pulse duration modulation (PDM) can be performed in many ways. An example of one way is shown in U.S. Pat. No. 3,587,092. A specialized form of PDM is delta-modulation which includes many variations; see, for example, U.S. Pat. No. 3,746,990. The prior art PDM systems have several inherent disadvantages. One disadvantage is that the resulting digital signal has an input-dependent d.c. level. Another disadvantage is that the value of the power spectrum at a particular frequency or over a particular period is not constant. These disadvantages make magnetic recording less efficient because a d.c. level cannot be recorded (or recovered) and the variations in the frequency spectrum make complete recovery of the signal impossible, especially when there are differences in the recording and playback speeds of the magnetic medium.

A transmission or recording system embodying the invention circumvents the limitations of the prior art by providing a digital signal which has a fixed duration and thereby maintains a relatively constant power spectrum. The average power level remains substantially constant so as to minimize distortion. The signal is self-clocking and contains no frequency component at zero Hertz, i.e., no d.c. power, making it useful in magnetic tape recordings with reduced low frequency distortion and for improved transmission in the presence of noise. In an embodiment of a circuit according to the invention, there are means for generating triangular signals having a given period and means for generating square wave pulses having the same period. There are also modulator means for receiving the analog signals and which are responsive to said triangular signals for producing digital signals. The digital signals from the modulator means are coupled to a gating means which is also responsive to the square wave signals, the gating means producing an output signal of one level when the logical values of the input signals are the same and of another level when the logical values of the input signals are different.

Figure 1:
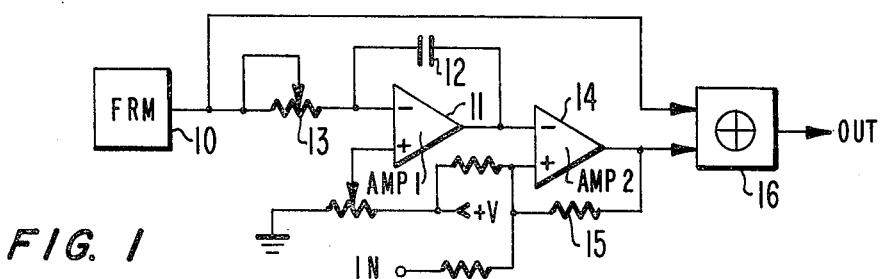
FIG. 1 is a block diagram of an encoding circuit according to one embodiment of the invention.
Figure 2:
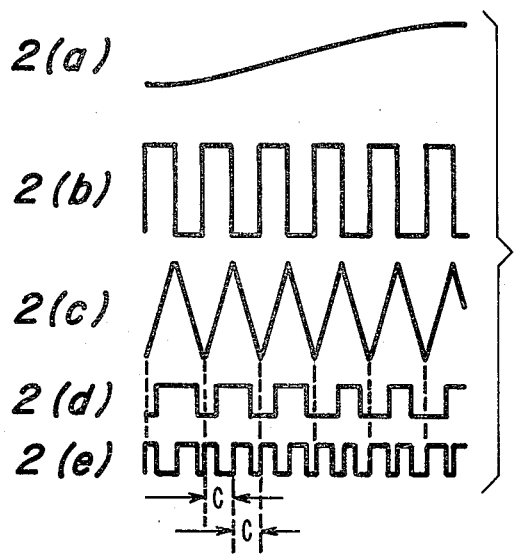
FIG. 2 (comprised of 2a-2e) is a timing diagram showing waveshapes at various points in the circuit of FIG. 1.

The circuit of FIG. 1 illustrates the generation of an odd symmetric function signal by digitally modulating an analog signal with a triangular signal and Exclusive OR-ing the resulting digital signal with a square-wave signal having the same period as the triangular signal. The circuit includes a free-running multivibrator (FRM) 10 which produces a square wave output signal such as shown in FIG. 2(b). An integrator including a high impedance, high-gain operational amplifier 11, a feedback capacitor 12, and an input resistor 13 is coupled to receive the square wave signals and to generate therefrom a triangular waveform, such as shown in FIG. 2(c), having the same period as and substantially in phase with the square wave signals from the FRM 10. The resistor 13 can be made variable if it is desired to permit adjustment of the slope of the triangular wave shape signal. The period of the square wave signal of FIG. 2(b) is less than the period of the highest frequency component $f_H$ which is desired to be retained in the analog input signal of FIG. 2(a) in accordance with Nyquist's Theorem.

The analog signal to be encoded is coupled to the non-inverting input of a comparator 14 which can be an operational amplifier 14 having positive feedback such as provided by a resistor 15. The other input to the comparator 14 is the triangular signal from the integrator amplifier 11. The output signal from the comparator 14 is shown in FIG. 2(d).

Both the square wave signal from the FRM 10 and the output signal from the comparator 14 are coupled to an Exclusive OR gate 16 to produce the desired digital output signals, which are illustrated in FIG. 2(e) as the output signal corresponding to an analog input signal illustrated in FIG. 2(a).

Figure 4:
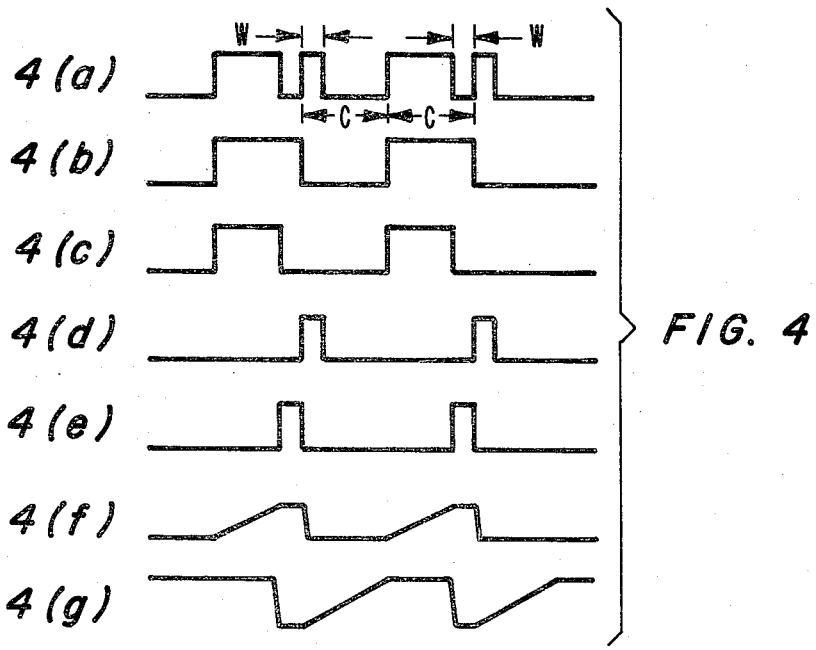
FIG. 4 (comprised of 4a-4g) is a timing diagram showing waveshapes at various points in the circuit of FIG. 3.

If the period of a cell is defined as a period of the square wave signal from the FRM 10, then the result is that each half-cell (C) of the output signal of FIG. 2(e), but better shown in FIG. 4(a) is approximately an odd function. That is, rotating the first half-cell waveform about the center of the cell produces the second half-cell waveform. The symmetry of the odd function over a cell time depends on the rate of change of the input signal during the cell time and can be made as exact as desired by increasing the frequency of the square wave signal in relation to the highest frequency of interest in the input analog signal. For purpose of the present discussion, the departure from odd symmetry between two adjacent half cells is not significant and so their signal will be referred to as exhibiting odd symmetry. The symmetry results in the d.c. level being substantially constant. The odd symmetry of the output signal can be used to decode the signal from magnetic tape so as to derive a self-adjusting cell width time which is dependent on the tape speed as described below.

Figure 3:
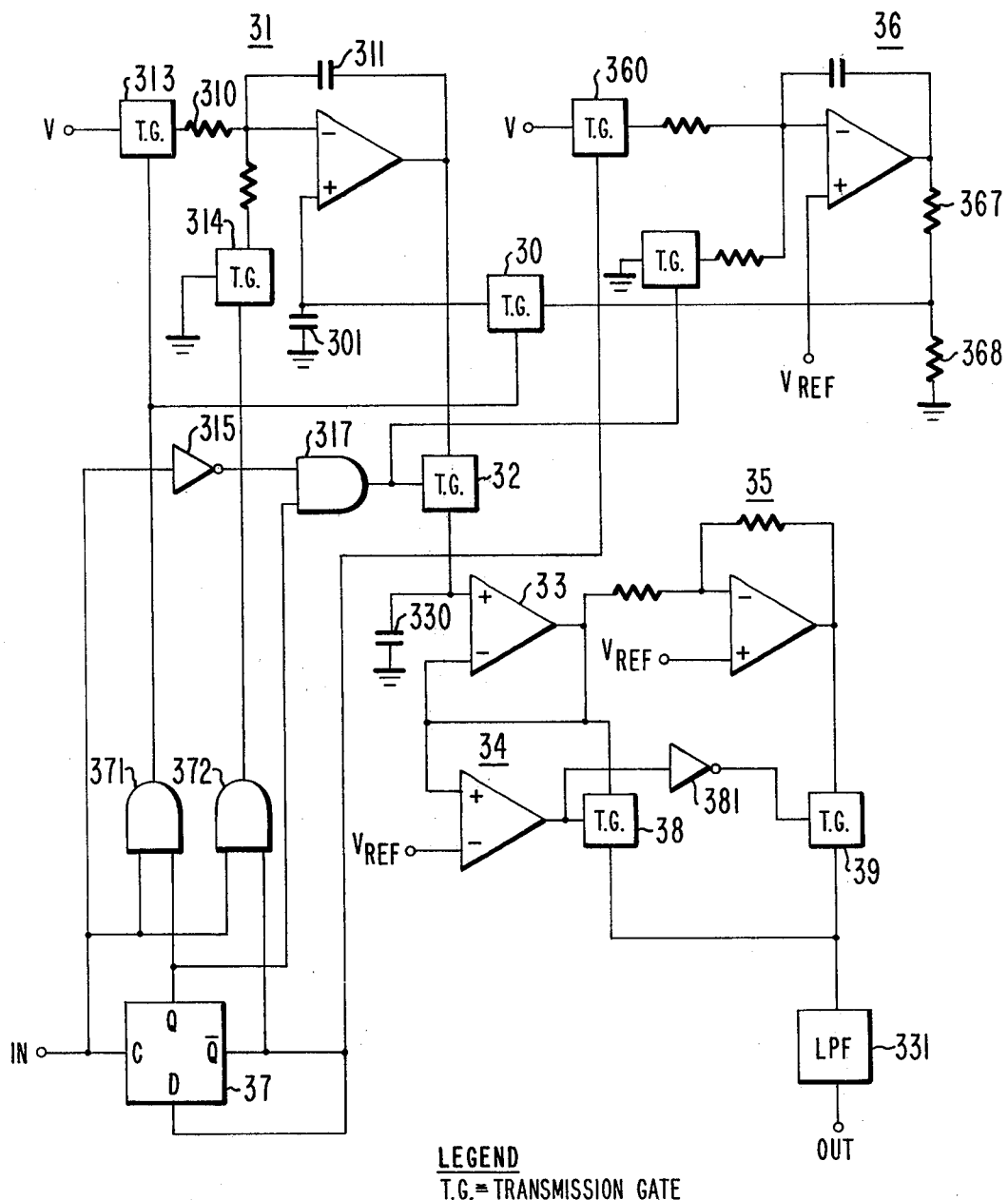
FIG. 3 is a decoder according to one embodiment of the invention for converting the digital signals into analog signals.

The circuit illustrated in FIG. 3 is a decoder circuit for converting the odd symmetric digital signals into replicas of the original analog signals. The circuit includes two integrators 31 and 36, a sample and hold circuit gate 33, an analog inverter 35, an output switching circuit including a comparator 34, and an input timing switch including a flip-flop 37. The explanation of the operation of the circuit of FIG. 3 will be made with references to FIG. 4, which is an illustration of idealized waveforms at various points in the circuit of FIG. 3.

A half-cell time, C in FIG. 4(a), can be measured as the time between two successive positive-going signal transitions. The decoding circuit of FIG. 3 compares the width of the pulses, W, to the half-cell time, C. The half-cells are subject to distortion and may be stretched or compressed in recording, playback, transmission or reception because of speed fluctuations in the recording medium and time varying delays in the transmission medium. The circuit according to the invention, however, measures the ratio of the pulse width W to the half-cell time C because the ratio during any half cell, remains substantially fixed, i.e., is relatively free from noise and distortion.

The input signal (IN) of FIG. 3 which comprises the output signal of Exclusive OR gate 16 of FIG. 1, operates as a clock signal for the toggle type flip-flop 37 and serves also as an input signal to each of two AND gates 371 and 372. The input signal is also applied through an inverter 315 to an AND gate 317. The output signal from the AND gate 317 controls a transmission gate 32 which couples the output signal from the integrator 31 to a sample and hold circuit including a unity gain coupled operational amplifier 33 and a capacitor 330. The input signal is illustrated in FIG. 4(a).

The AND gates 371 and 372 are primed by the set (Q) and reset ($\overline{Q}$) output signals from the flip-flop 37, respectively. Because the flip-flop 37 is coupled as a toggle flip-flop, it is set and reset during alternate half cycles or half cell times of the input signal, thereby priming the AND gate 371 during one half-cell time and the AND gate 372 during the following half-cell time. The output signals from the AND gates 371 and 372 control the input voltages to the integrator 31 via two transmission gates 313 and 314, respectively. When the flip-flop 37 is set and the input signal (IN) is high (logical one), the output signal from the AND gate 371 turns on the transmission gate 313 causing the output signal from the integrator 31 to ramp linearly toward its supply voltage, which can be V. When the flip-flop 37 is reset and the input signal (IN) is high, the output signal from the AND gate 372 activates the transmission gate 314, returning the integrator input to ground (or some other reference voltage) through an associated resistor. The slope of the output signal is determined by the input voltage and the time constant of the feedback capacitor and input resistor. The time constant of the integrator 31 when its input voltage is ground (negative-going ramp) is made very short relative to the time constant of the positive-going ramp. The output signal from the integrator is shown in FIG. 4(f). The output signal from the the gate 371 is shown in FIG. 4(c) and the output signal from the AND gate 372 is shown in FIG. 4(d). The set output signal from the flip-flop 37 is shown in FIG. 4(b). The input signal to the non-inverting input of the integrator 31 is discussed below.

When the input signal is low and the flip-flop 37 is set, the AND gate 317 is activated, turning on the transmission gate 32 which charges the capacitor 330 to the voltage level of the ramp output signal from the integrator 31. The output signal from the AND gate 317 is shown in FIG. 4(e).

The operational amplifier 33, feedback coupled as a unity gain amplifier, produces an output voltage equal to the voltage on the capacitor 330. Because of the high input impedance of the operational amplifier 33, the capacitor 330 substantially maintains its charge while the transmission gate 32 is cut-off, i.e., the amplifier 33 and capacitor 330 form a sample-and-hold circuit. The output signal from the sample-and-hold circuit is compared to a reference voltage by a comparator 34, the output signal from which turns on a transmission gate 38 to couple the output signal from the amplifier 33 to the system output terminal (OUT). The output signal from the comparator 34 is inverted by an inverter 381 to couple the inverted output signal from the amplifier 33 via an inverting amplifier 35, including a high gain operational amplifier feedback coupled as a unity gain amplifier, to the system output terminal (OUT).

The integrator 31 is designed to produce a positive ramp having a slope of V/C, where V is the supply voltage and C is the time period of a half-cell. It integrates for C−W seconds while the flip-flop 37 is set and the output voltage ramps up to a value equal to V(1−W/C), i.e., proportional to the ratio of W and C. (V1−W/C)=(V/C) (C−W)) This voltage is maintained at the integrator output until the end of the half-cell time at which time the output signal from the AND gate 372 effectively discharges the capacitor 311 to ground via the transmission gate 314.

When the transmission gate 32 is activated, the capacitor 330 is charged to the voltage V(1−W/C). The output signal from the amplifier 33 supplies this same voltage to the output terminal (OUT) via the transmission gate 38 if the voltage is greater than a reference voltage. Otherwise, the signal of the same value but of opposite polarity with respect to the reference voltage is supplied to the system output by the transmission gate 39. The output signal (OUT) is in effect a step approximation of any desired accuracy of the desired analog waveform. This step approximation can be filtered with a low-pass filter 331 that has a cut-off frequency approximately equal to the highest frequency of interest in the analog signal. The value of the reference voltage, $V_{ref}$, can be chosen as the midpoint between +V and ground to permit the operational amplifiers used in the circuit to operate with a unipolar power supply.

The integrator 36 acts as a distortion sampled feedback amplifier to correct the integration slope of the integrator 31. The integrator 36 integrates relative to the reference voltage in a positive direction while the flip-flop 37 is reset which, via the $\overline{Q}$ signal, activates a transmission gate 360 coupling the integrator input to the supply voltage, V. The integrator 36 operates over an entire half-cell time, that is, the opposite half-cell from that of the integrator 31 and produces therefore an output signal proportional to the half-cell time C. The output signal from the integrator 36 is divided, e.g., by two, by a voltage divider including two resistors 367 and 368. The resulting signal is coupled to the non-inverting input of the integrator 31 via the transmission gate 30. A capacitor 301 holds this voltage during the time that the integrator 31 is integrating in a positive direction, i.e., during the following half-cell time. This establishes a signal-dependent variable reference voltage for the integrator 31 that decreases with shorted cell times and increased for longer cell times to provide a substantially constant slope V/C in the integrator 31. The output signal from the integrator 36 is illustrated in FIG. 4(g).

The decoder described in detail above has been shown to decode the digital signals of symmetric odd functions into a stepped version of the desired analog signal. This is accomplished by integrating the input signal to produce a signal voltage proportional to the ratio of the pulse width to the half-cell times. The signal voltage has a correction signal applied thereto to maintain a constant slope value. The output signal voltage is sampled during each cell time to produce a stepped approximation to the desired analog signal, which is suitably filtered to produce the analog signal.

What is claimed is:

1. A system for encoding an input analog signal having a highest frequency component $f_H$ and comprising:
    means for supplying square wave signals having a given period T and upper and lower levels of constant and equal duration;
    means for supplying triangular signals in phase with said square wave signals and having said given period T less than $1/f_H$;
    modulator means responsive to said triangular signals and to said input analog signal for producing pulses at a rate equal to 1/T and whose widths are proportional to the amplitude of said input analog signal at the times of equality therebetween; and
    gating means receiving as input signals thereto said square wave signals and said pulses for producing an output signal at one level when the logical values of the input signals thereto are the same and of another level when the logical values of the input signals thereto are different.

2. The invention as claimed in claim 1 wherein said modulator means include comparator means for producing an output signal having one logical value when the amplitude of said triangular signal is greater than the amplitude of the input analog signal and having another logical value when the amplitude of said triangular signal is not greater than the amplitude of the input analog signal.

3. The invention as claimed in claim 1 wherein said gating means includes Exclusive-OR gating means.

4. A system for communicating analog input signals having a highest frequency component $f_H$ and comprising, in combination:
    transmission means responsive to said analog input signals for producing digital output signals, said transmission means including;
    square wave signal generating means for producing square wave signals having a given period less than $1/f_H$ and upper and lower levels of contant and equal duration;
    triangular signal generating means for producing signals in phase with said square wave signals and having said given period;
    comparator means responsive to said analog input signals and to said triangular signals for producing output signals having a first or second logical value dependent upon the relative magnitudes of said analog input signals and said triangular signals;
    gating means for Exclusive ORing said square wave signals with the output signals from said comparator means to produce digital signals; and
    receiving means responsive to said digital signals from said gating means for reproducing said analog input signals, including
    means for producing a voltage proportional to the time duration of adjacent levels of said received digital signals.

5. The invention as claimed in claim 4 wherein said means for producing a voltage includes integrator means for integrating a fixed voltage during one level of said receiving digital signals during a period of said received digital signals.

6. The invention as claimed in claim 5 aand further comprising:
    sampling means for periodically sampling the output voltage from said integrator means to produce an output signal over a period of said received signals; and
    output filter means responsive to the output signal from said sampling means for producing a smoothed output signal.

7. A method for generating balanced pulse width modulated signals from an input analog signal having a highest frequency component $f_H$ and comprising the steps of:
    generating square wave signals having a given period less than $1/f_H$ and having upper and lower levels of constant and equal duration;
    generating triangular signals in phase with said square wave signals and having said given period;
    modulating said triangular signals with said input analog signals to produce signals; and
    exclusive-ORing said digital signals and said square wave signals to produce balanced pulse width modulated digital signals.

8. The invention as claimed in claim 7 wherein said step of generating triangular signals includes integrating said square wave signals.

9. The invention as claimed in claim 7 wherein said step of modulating includes comparing the magnitudes of said triangular signal and the magnitude of said input analog signal to produce a digital signal having one value when the magnitude of said triangular signal is greater than the magnitude of said input analog signal and having another value when the magnitude of said triangular signal is not greater than the magnitude of said input analog signal.

* * * * *

UNITED STATES PATENT AND TRADEMARK OFFICE
CERTIFICATE OF CORRECTION

PATENT NO. : 4,220,925

DATED : September 2, 1980

INVENTOR(S) : Chin Tao Wu

It is certified that error appears in the above-identified patent and that said Letters Patent is hereby corrected as shown below:

Column 4, line 24, $(V1-W/C)=(V/C)(C-W)$ should be ---$V(1-W/C)=(V/C)(C-W)$---;

Column 4, lines 64 and 65, "shorted" should be ---shorter--- and "increased" should be ---increases---;

Column 5, claim 4, line 51, "contant" should be ---constant---;

Column 6, claim 6, line 20 "aand" should be ---and---;

Signed and Sealed this

Eighteenth Day of August 1981

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,220,925

DATED : September 2, 1980

INVENTOR(S) : Chin Tao Wu

It is certified that error appears in the above-identified patent and that said Letters Patent is hereby corrected as shown below:

Column 6, claim 7, line 30, "modulated" should be
---modulating---;

Column 6, claim 9, line 49, "signal" should be
---signals---.

Signed and Sealed this

Twentieth Day of October 1981

[SEAL]

Attest:

GERALD J. MOSSINGHOFF

Attesting Officer     Commissioner of Patents and Trademarks